US010975838B2

(12) United States Patent
Bech

(10) Patent No.: US 10,975,838 B2
(45) Date of Patent: Apr. 13, 2021

(54) JOINT FOR CONNECTING A WIND TURBINE ROTOR BLADE TO A ROTOR HUB AND ASSOCIATED METHOD

(71) Applicant: Vestas Wind Systems A/S, Aarhus (DK)

(72) Inventor: Anton Bech, Ringkøbing (DK)

(73) Assignee: Vestas Wind Systems A/S, Aarhus (DK)

( * ) Notice: Subject to any disclaimer, the term of this patent is extended or adjusted under 35 U.S.C. 154(b) by 349 days.

(21) Appl. No.: 16/061,483

(22) PCT Filed: Dec. 9, 2016

(86) PCT No.: PCT/DK2016/050420
§ 371 (c)(1),
(2) Date: Jun. 12, 2018

(87) PCT Pub. No.: WO2017/101943
PCT Pub. Date: Jun. 22, 2017

(65) Prior Publication Data
US 2020/0263656 A1     Aug. 20, 2020

(30) Foreign Application Priority Data

Dec. 14, 2015 (DK) .......................... PA 2015 70820

(51) Int. Cl.
*F03D 1/06* (2006.01)
(52) U.S. Cl.
CPC ......... *F03D 1/0658* (2013.01); *F03D 1/0675* (2013.01); *F05B 2240/30* (2013.01); *F05B 2260/301* (2013.01)
(58) Field of Classification Search
CPC ...... F03D 1/065; F03D 1/0658; F03D 1/0675; F03D 1/06; F05B 2240/30; F05B 2260/301
See application file for complete search history.

(56) References Cited

U.S. PATENT DOCUMENTS 2,652,578 A * 9/1953 Chiaberta ................ B21K 1/56
                                                470/10
3,907,442 A * 9/1975 Reid ........................ B64C 3/34
                                                403/37
(Continued)

FOREIGN PATENT DOCUMENTS

CN    201125841 Y    10/2008
CN    101413479 A     4/2009
(Continued)

OTHER PUBLICATIONS

European Patent Office, International Search Report and Written Opinion in PCT Serial No. PCT/DK2016/050420, dated Mar. 2, 2017.
(Continued)

*Primary Examiner* — Igor Kershteyn
*Assistant Examiner* — Joshua R Beebe
(74) *Attorney, Agent, or Firm* — Wood Herron & Evans LLP

(57) ABSTRACT

A connecting joint for attaching a wind turbine rotor blade to a rotor hub includes a bolt having a blade end configured to be coupled to the rotor blade and a hub end configured to be coupled to the rotor hub. The bolt includes a neck region adjacent the blade end, wherein the neck region has a cross dimension less than a cross dimension of the blade end of the bolt. A wind turbine blade having such a connecting joint is also disclosed. Additionally, a method of making the connecting joint is disclosed.

17 Claims, 8 Drawing Sheets

(56) References Cited

U.S. PATENT DOCUMENTS

| | | | | |
|---|---|---|---|---|
| 5,659,380 A * | 8/1997 | Kobayashi | ............... | G02C 1/02 |
| | | | | 351/110 |
| 5,779,416 A | 7/1998 | Sternitzky | | |
| 6,113,299 A * | 9/2000 | Reichelt | ................... | B60G 7/02 |
| | | | | 403/13 |
| 7,517,194 B2 * | 4/2009 | Doorenspleet | ........ | F03D 1/0658 |
| | | | | 416/204 R |
| 8,025,485 B2 * | 9/2011 | Jacobsen | ............... | F03D 1/0658 |
| | | | | 416/204 A |
| 2011/0142657 A1 | 6/2011 | Jacobsen | | |
| 2014/0079555 A1 | 3/2014 | Seufert et al. | | |
| 2016/0290313 A1 | 10/2016 | Zwart | | |

FOREIGN PATENT DOCUMENTS

| | | | | |
|---|---|---|---|---|
| CN | 102287320 A | 12/2011 | | |
| CN | 102548715 A | 7/2012 | | |
| CN | 105089944 A | 11/2015 | | |
| EP | 0057272 A2 | 8/1982 | | |
| KR | 101345716 B1 | 12/2013 | | |
| WO | WO-2012140062 A2 * | 10/2012 | ............. | B29C 70/86 |
| WO | 2014076183 A1 | 5/2014 | | |

OTHER PUBLICATIONS

Danish Patent and Trademark Office, Search and Examination Report in PA 2015 70820, dated Jul. 1, 2016.
China National Intellectual Property Administration, First Notification of Office Action in CN Application No. 201680081213.9, dated Jul. 18, 2019.

* cited by examiner

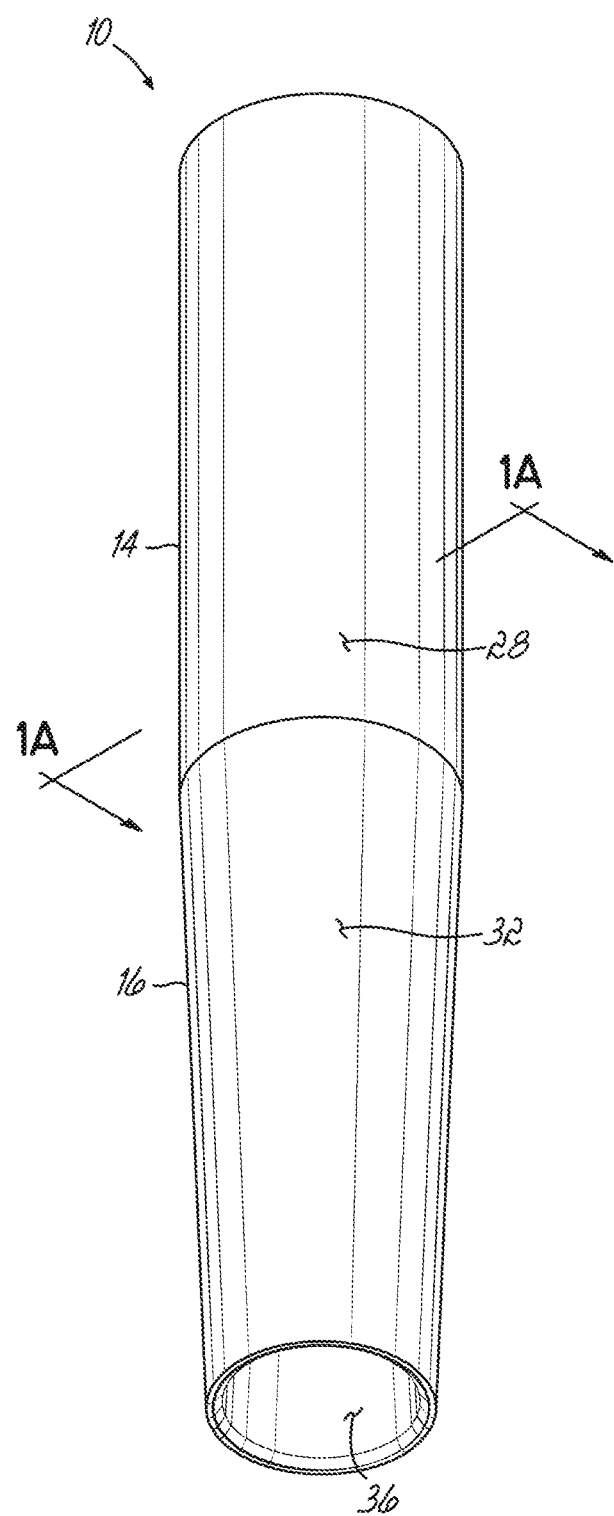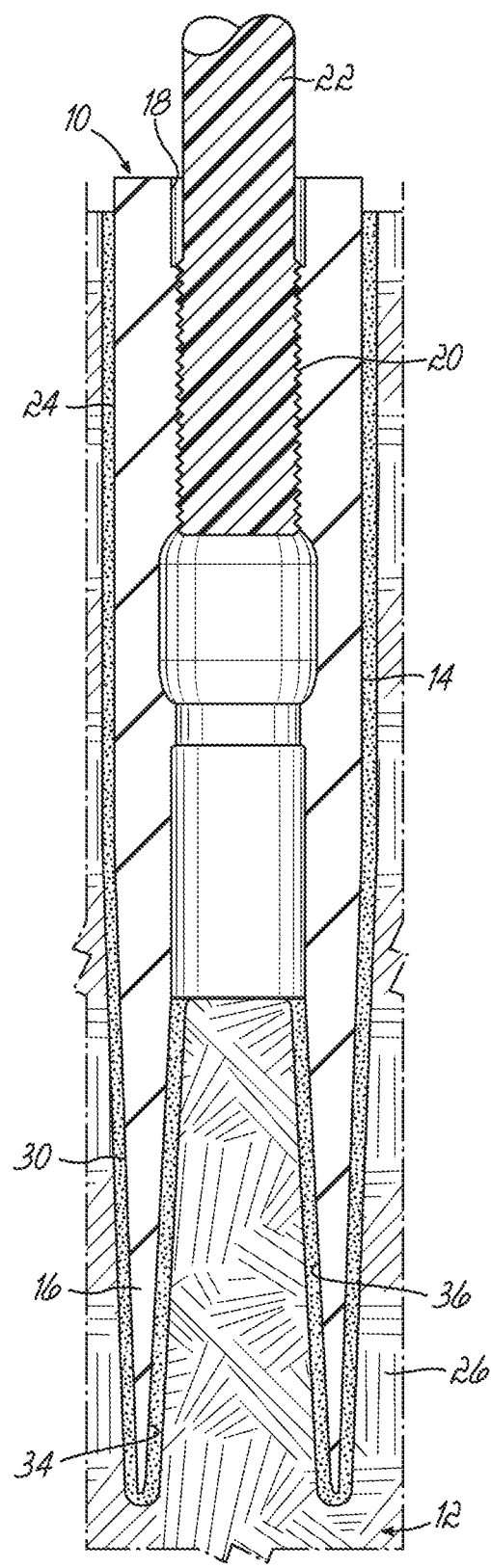
FIG. 1
PRIOR ART
FIG. 1A
PRIOR ART

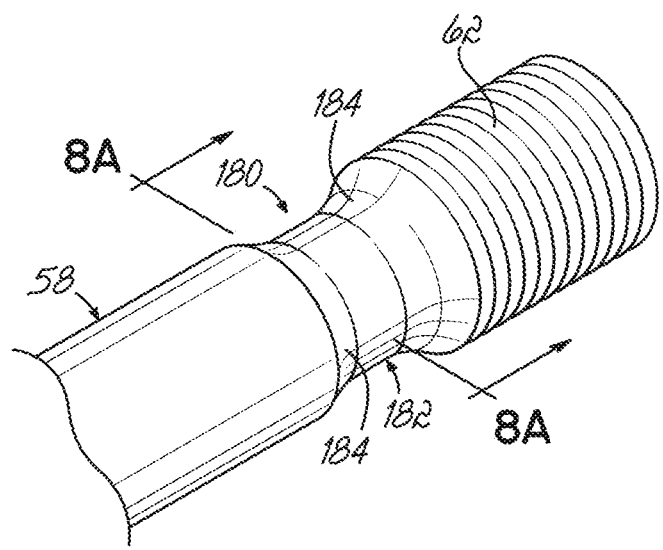
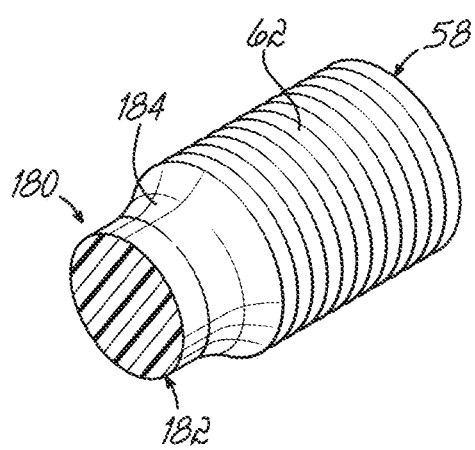
FIG. 8      FIG. 8A
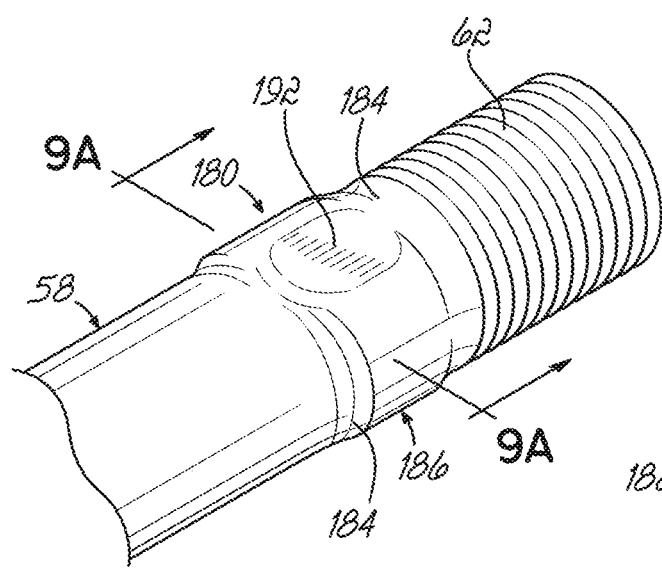
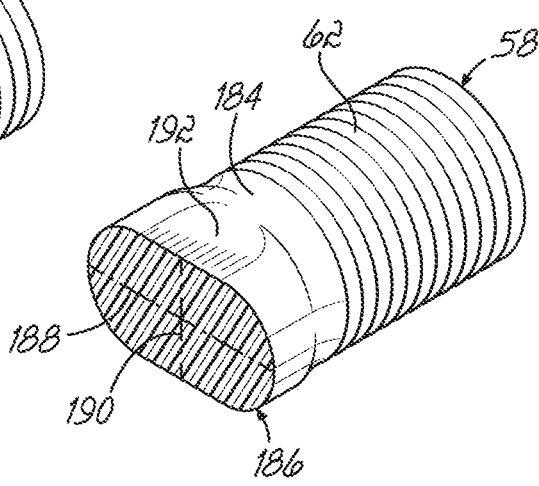
FIG. 9      FIG. 9A

JOINT FOR CONNECTING A WIND TURBINE ROTOR BLADE TO A ROTOR HUB AND ASSOCIATED METHOD

TECHNICAL FIELD

The invention relates generally to wind turbines, and more particularly to an improved joint for connecting a wind turbine rotor blade to a rotor hub, and a method of forming a wind turbine rotor blade having an improved joint for connecting the wind turbine blade to the rotor hub.

BACKGROUND

Wind turbines are used to produce electrical energy using a renewable resource and without combusting a fossil fuel. Generally, a wind turbine converts kinetic energy from the wind into electrical power. A horizontal-axis wind turbine includes a tower, a nacelle located at the apex of the tower, and a rotor having a central hub and a plurality of blades coupled to the hub and extending outwardly therefrom. The rotor is supported on a shaft extending from the nacelle, which shaft is either directly or indirectly operatively coupled with a generator which is housed inside the nacelle. Consequently, as wind forces the blades to rotate, electrical energy is produced by the generator.

In recent years, wind power has become a more attractive alternative energy source and the number of wind turbine, wind farms, etc. has significantly increased, both on land and offshore. Additionally, the size of wind turbines has also significantly increased, with modern wind turbine blades extending between 50 to 80 meters in length, and is expected to further increase in the future. The increased length in the wind turbine blades has introduced a number of interesting design considerations for wind turbine designers and manufacturers. For example, with increasing blade length, the joint between the wind turbine blade to the rotor hub may experience increased stresses that present challenging design considerations in order to ensure that the joint can withstand the loads expected during the operating life of the wind turbine.

Conventional joints between wind turbine rotor blades and the rotor hub include threaded stud bolts coupled to and extending from the root end of the wind turbine blade, which are in turn coupled to a pitch bearing associated with the rotor hub. Wind turbine blades are typically made from one or more composite materials formed from fibrous material and resin. Such materials generally do not have the structural integrity to provide a secure fixing mechanism into which the threaded stud bolts may be directly inserted. A hole or bore, for example, may be tapped into the composite material at the root end of the rotor blade to provide a complementing thread upon which the stud bolt may achieve a connection. However, the composite material has insufficient shear strength to transfer the loads between the blades and hub via the stud bolts and deterioration of the composite material at the interface would occur.

For this reason, it is generally known to utilize internally threaded metal inserts at the interface between the threaded stud bolts and the composite material at the root end of the wind turbine blade. In this regard, bores are typically formed along the circumference of the root end of the wind turbine blade. The metal inserts are then positioned within the bores and adhesively bonded therein to essentially embed the metal inserts within the composite material of the rotor blade. The stud bolts are then threadably engaged with the metal inserts. The forces acting between the rotor blade and rotor hub act through the stud bolts, and thus are transferred via the metal inserts, which operate to more uniformly distribute the forces over the interface area with the softer composite material. The force distribution characteristics provided by the metal inserts in turn provide a connection joint with a structural integrity sufficient to provide a secure connection between the rotor hub and rotor blade during use.

As illustrated in FIGS. 1 and 1A, current metal inserts 10 for wind turbine blades 12 include a generally cylindrical main body 14 and a tubular extension 16 projecting from one end of the main body 14. The main body 14 includes a bore 18 including a threaded portion 20 for receiving and threadably coupling to a bolt such as a stud bolt 22. The main body 14 defines an interface 24 with the composite material 26 of the wind turbine blade 12 at the outer surface 28 of the main body 14. The tubular extension 16 extends from the main body 14 and defines an outer interface 30 with the composite material 26 of the blade 12 at the outer surface 32 of the tubular extension 16 and an inner interface 34 with the composite material 26 of the blade 12 at the inner surface 36 of the tubular extension 16. As noted above, the inserts 10 are positioned within bores in the root end of the blade and bonded to the composite material using a suitable adhesive, such as an epoxy.

While current connection joints are sufficient to achieve their intended purpose of supporting the loads between the rotor blades and rotor hub, one drawback is that as the size of wind turbine blades continues to increase, the size of the connection joint will generally increase. Thus, the size of the blade at the root end will increase (e.g., larger and larger diameters) and the size of the hub and pitch bearing will increase, all of which results in significant increases in material and manufacturing costs. Additionally, the number, length and/or diameter of the metal inserts must generally correspondingly increase so as to accommodate the shear stresses on the bonding adhesive that joins the metal inserts and composite material. This again increases material and manufacturing costs.

Accordingly, there is a need for an improved connection joint for attaching the root end of wind turbine blades to a rotor hub that overcomes the drawbacks in scaling of current connection joints and accommodates increased loading of the blades in an improved manner.

SUMMARY

To address these and other drawbacks, a connecting joint for attaching a wind turbine rotor blade to a rotor hub comprises a bolt having a blade end configured to be coupled to the rotor blade and a hub end configured to be coupled to the rotor hub. The bolt includes a neck region adjacent the blade end, wherein the neck region has a cross dimension less than a cross dimension of the blade end of the bolt. In an exemplary embodiment, the blade end of the bolt is threaded and the neck region is immediately adjacent the threads on the blade end of the bolt. The hub end of the bolt may also be threaded.

In one embodiment, the neck region is generally cylindrical and has a diameter less than a diameter of the blade end of the bolt. For example, the diameter of the neck region may be reduced between about 5% and about 40% relative to the diameter of the blade end of the bolt. In another embodiment, the neck region is generally elliptical having a first cross dimension that forms the major axis of the elliptical cross section, and a second cross dimension that forms the minor axis of the elliptical cross section, wherein the minor axis has a length less than a cross dimension of the blade end of the bolt. In one embodiment, for example, the minor axis has a length less than a diameter of the blade end of the bolt. The length of the minor axis may be reduced between about 5% and about 40% relative to the diameter of the blade end of the bolt. Additionally, the length of the major axis may be greater than a cross dimension of the blade end of the bolt. Thus in one embodiment, the major axis has a length greater than a diameter of the blade end of the bolt. In this embodiment, the cross sectional area of the neck region may be substantially the same as the cross-sectional area of the blade end of the bolt. Additionally, in this embodiment, the bolt may include an indicator adjacent the hub end that corresponds to an orientation of the neck region. For example, the indicator may include a groove corresponding to the direction of the major axis of the elliptical cross section.

In one embodiment, the neck region has a first end adjacent the blade end of the bolt and a second end adjacent the hub end of the bolt, wherein the cross dimension of the neck region is less than a cross dimension of the bolt adjacent the neck region and between the second end and the hub end of the bolt. In an exemplary embodiment, for example, the neck region may have a length between the first and second ends between about 0.5 D and about 2 D, where D is the diameter of the blade end of the bolt. Additionally, the neck region may include a transition to provide for a smooth change in the cross dimension of the bolt.

In a further embodiment, the connecting joint further includes an insert configured to be coupled to the wind turbine rotor blade, wherein the blade end of the bolt is configured to be coupled to the insert. For example, the blade end of the bolt may be threadably engaged with the insert. Preferably, the bolt is a stud bolt.

In one embodiment, a wind turbine blade has a root end and a tip end and includes a plurality of connecting joints including the bolts as described above and inserts embedded in the root end of the rotor blade. In an exemplary embodiment, the inserts include a main body having a first end and a second end, a central bore open to the first end and extending toward the second end, and an outer surface that interfaces with the blade; a first tubular extension extending away from the second end of the main body and having an inner surface and an outer surface, wherein each of the inner and outer surfaces interface with the blade; and a second tubular extension extending away from the main body and having an inner surface and an outer surface, wherein each of the inner and outer surfaces interface with the blade.

When the bolt has an elliptical configuration, there may be a preferred orientation of the bolt relative to a central axis of the rotor blade at the root end when the bolt is coupled to the rotor blade, such as via the inserts. In this regard, when the bolts are engaged with the inserts, the bolts are oriented such that the major axis of the elliptical cross section of the neck region is substantially perpendicular to radial lines emanating from the central axis of the rotor blade. Thus when the blade bend under load, the stresses in the neck region of the bolts are reduced as a result of the reduction in the cross dimension.

In another embodiment, a method of forming a connecting joint for attaching a wind turbine rotor blade to a rotor hub includes providing a bolt having a blade end and a hub end, and forming a neck region in the bolt adjacent the blade end, wherein the neck region has a cross dimension less than a cross dimension of the blade end of the bolt.

In one embodiment, forming the neck region further includes machining the bolt to form a generally cylindrical neck region having a diameter less than a diameter of the blade end of the bolt. In another embodiment, forming the neck region includes pressing opposite sides of the bolt to form a generally elliptical neck region having a major axis and a minor axis. The minor axis has a length less than a cross dimension of the blade end of the bolt. The cross-sectional area may remain substantially constant during the formation of the elliptical neck region.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

FIG. 1 is a top plan view of a metal insert for a wind turbine blade according to the prior art;

FIG. 1A is a cross-sectional view of the metal insert shown in FIG. 1;

FIG. 8 is a partial perspective view of a stud bolt;

FIG. 8A is a perspective view of the stud bolt of FIG. 8 taken generally along the line 8A-8A;

FIG. 9 is a partial perspective view of a stud bolt;

FIG. 9A is a perspective view of the stud bolt of FIG. 9 taken generally along the line 9A-9A;

DETAILED DESCRIPTION

Figure 2:
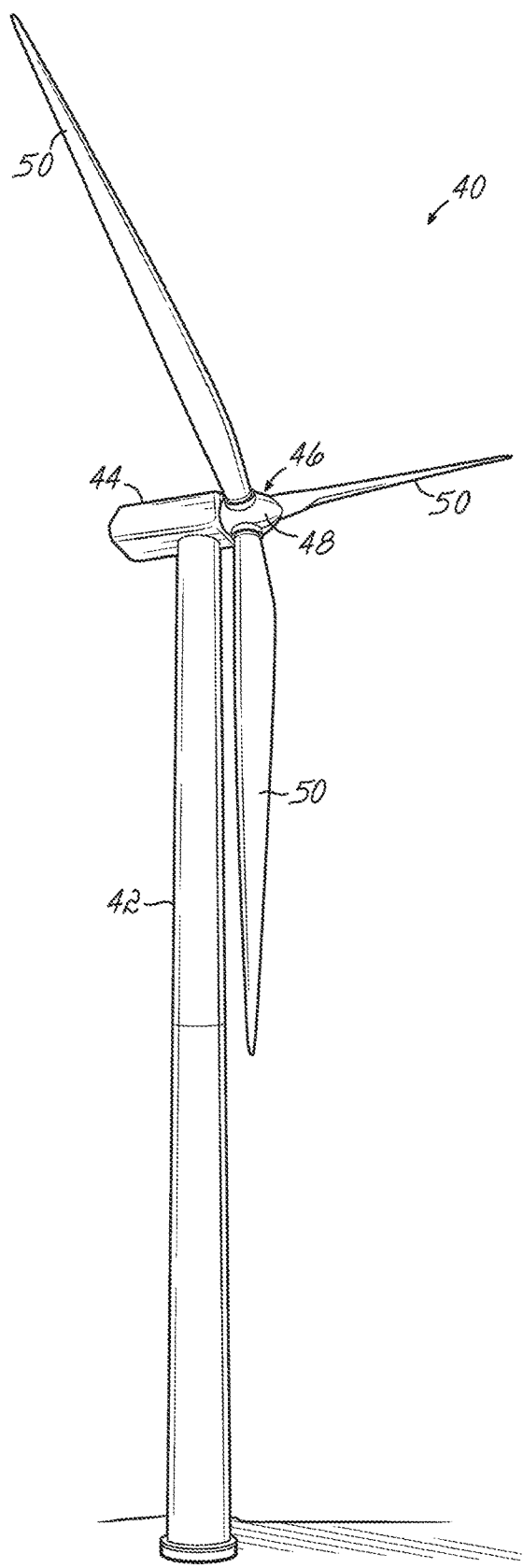
FIG. 2 is a perspective view of a wind turbine in which embodiments of the invention may be used.

With reference to FIG. 2, a wind turbine 40 includes a tower 42, a nacelle 44 disposed at the apex of the tower 42, and a rotor 46 operatively coupled to a generator (not shown) housed inside the nacelle 44. In addition to the generator, the nacelle 44 houses miscellaneous components required for converting wind energy into electrical energy and various components needed to operate, control, and optimize the performance of the wind turbine 40. The tower 42 supports the load presented by the nacelle 44, the rotor 46, and other components of the wind turbine 40 that are housed inside the nacelle 44 and also operates to elevate the nacelle 44 and rotor 46 to a height above ground level or sea level, as may be the case, at which faster moving air currents of lower turbulence are typically found.

The rotor 46 of the wind turbine 40, which is represented as a horizontal-axis wind turbine, serves as the prime mover for the electromechanical system. Wind exceeding a minimum level will activate the rotor 46 and cause rotation in a plane substantially perpendicular to the wind direction. The rotor 46 of wind turbine 40 includes a central hub 48 and at least one rotor blade 50 that projects outwardly from the central hub 48 at locations circumferentially distributed thereabout. In the representative embodiment, the rotor 46 includes three blades 50, but the number may vary. The blades 50 are configured to interact with the passing air flow to produce lift that causes the central hub 48 to spin about a central longitudinal axis.

The wind turbine 40 may be included among a collection of similar wind turbines belonging to a wind farm or wind park that serves as a power generating plant connected by transmission lines with a power grid, such as a three-phase alternating current (AC) power grid. The power grid generally consists of a network of power stations, transmission circuits, and substations coupled by a network of transmission lines that transmit the power to loads in the form of end users and other customers of electrical utilities. Under normal circumstances, the electrical power is supplied from the generator to the power grid as known to a person having ordinary skill in the art.

As is well known in the industry, for certain wind turbine designs, the rotor blades 50 are coupled to the rotor hub 48 in a manner that allows the blades 50 to rotate or pitch about a longitudinal axis of the blades 50. This is achieved by coupling the root end 52 of a blade 50 to a pitch bearing (not shown) operatively coupled to the rotor hub 48. The pitch bearing generally includes a ring rotatable relative to the hub 48 to which the root end of the blade 50 is coupled. Pitch bearings are generally well known in the art and thus will not be described in further detail herein.

Figure 3:
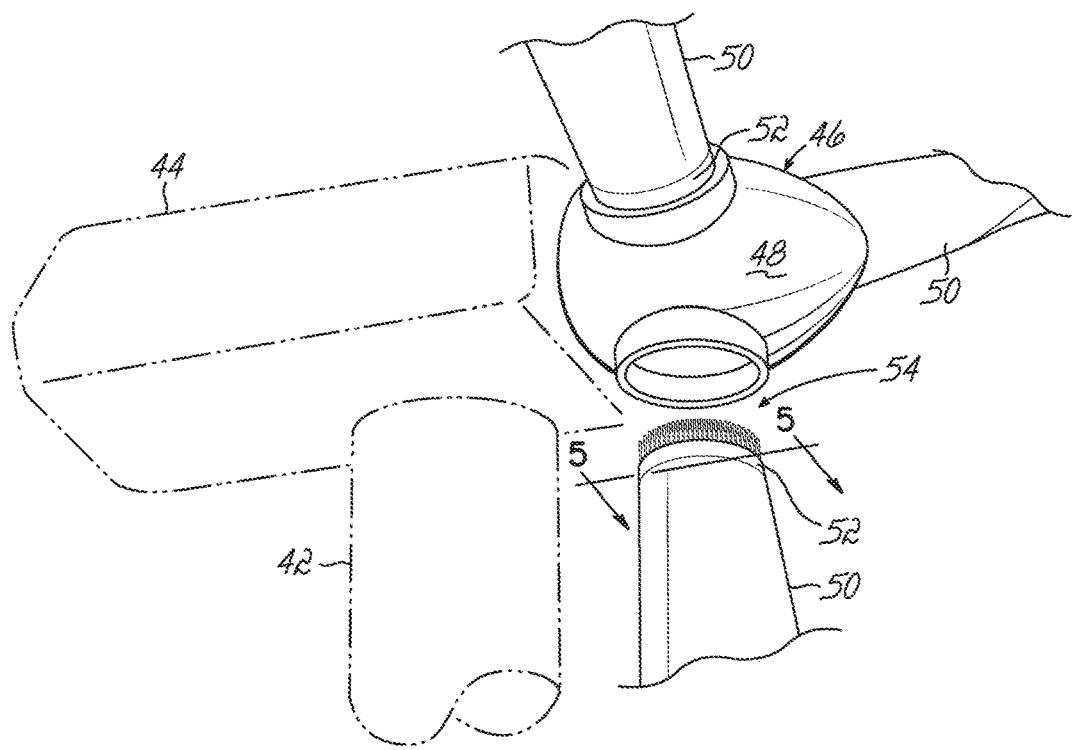
FIG. 3 is a perspective view of a wind turbine rotor blade and rotor hub having a connection joint.
Figure 4:
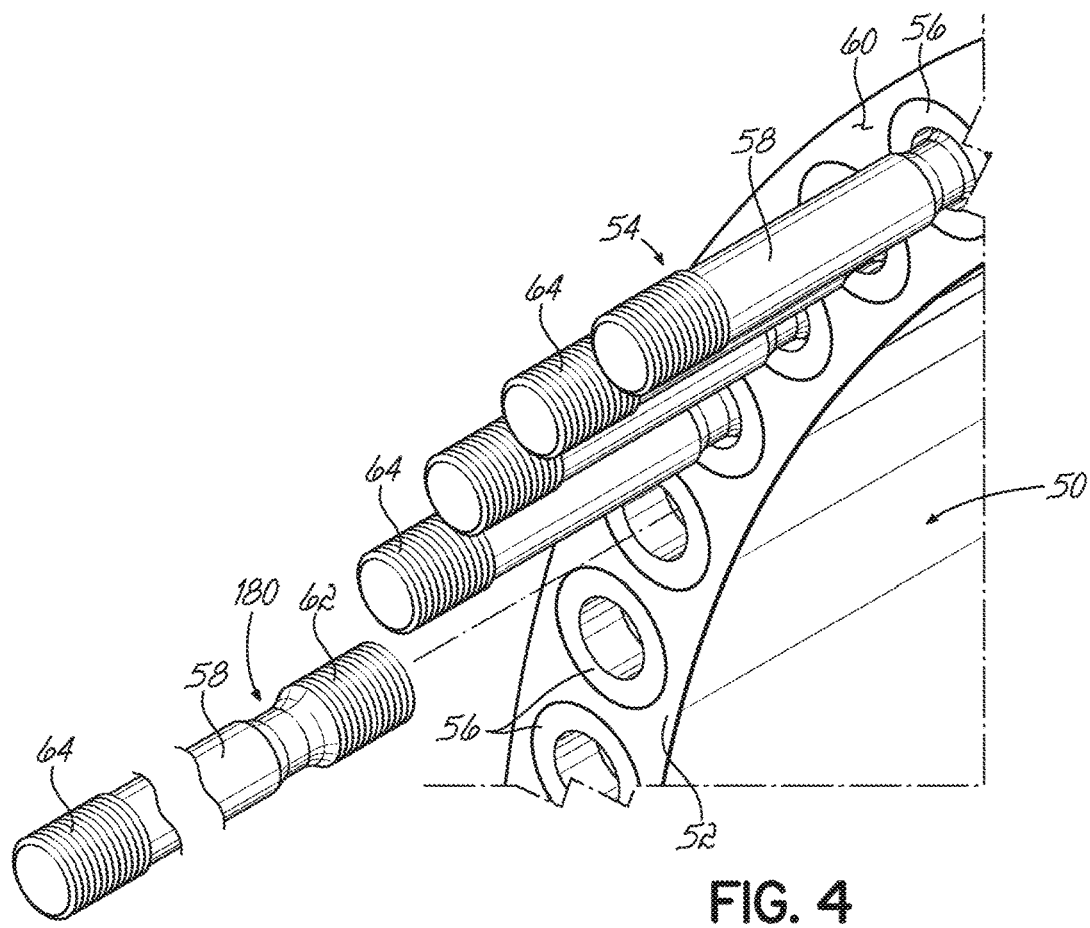
FIG. 4 is an enlarged perspective view of a root end of a wind turbine blade.

As illustrated in FIGS. 3 and 4, a connection joint 54 between a rotor blade 50 of the wind turbine 40 and the rotor hub 48 includes a plurality of inserts 56 coupled to the rotor blade 50 at the root end 52 thereof, and a plurality of bolts 58, which in this example are stud bolts configured to be coupled to the inserts 56 in the rotor blade 50 and further configured to be coupled to the rotor hub 48 (FIG. 3), such as through the pitch bearing. As illustrated in FIG. 4, the inserts 56 may be circumferentially spaced about an end face 60 at the root end 52 of the blade 50 and embedded within the material of the blade 50 such that a connecting end of the insert 56 slightly protrudes (e.g., about 5 mm) from the end face 60 of the blade 50. A method for positioning the inserts 56 within the material of the blade 50 will be described more fully below. The number of inserts 56 along the circumference of the root end 52 of the blade 50 depends on the size of the blade, among potential other factors, but may be anywhere from 80 to 180 inserts for blades between 50 m-80 m in length. It should be realized that more or less inserts may be used depending on the specific application.

The stud bolts 58 are generally cylindrical elongate members having a threaded blade end 62 and a threaded hub end 64. As illustrated in FIG. 3, during assembly of the wind turbine 40, the stud bolts 58 are threadably engaged with the inserts 56 at the root end 52 of the wind turbine blade 50 such that the threaded hub end 64 of the stud bolts 58 extends away from the root end 52 of the blade 50. The stud bolts 58 are then aligned with corresponding holes in the pitch bearing on the hub 48, inserted therethrough, and secured to the pitch bearing via a threaded fastener or the like. Through the connection joint 54, a wind turbine blade 50 may be securely coupled to the rotor hub 48 of the wind turbine 40 and generally accommodates the loads applied to the blades 50 during the operational life of the wind turbine 40.

Figure 5:
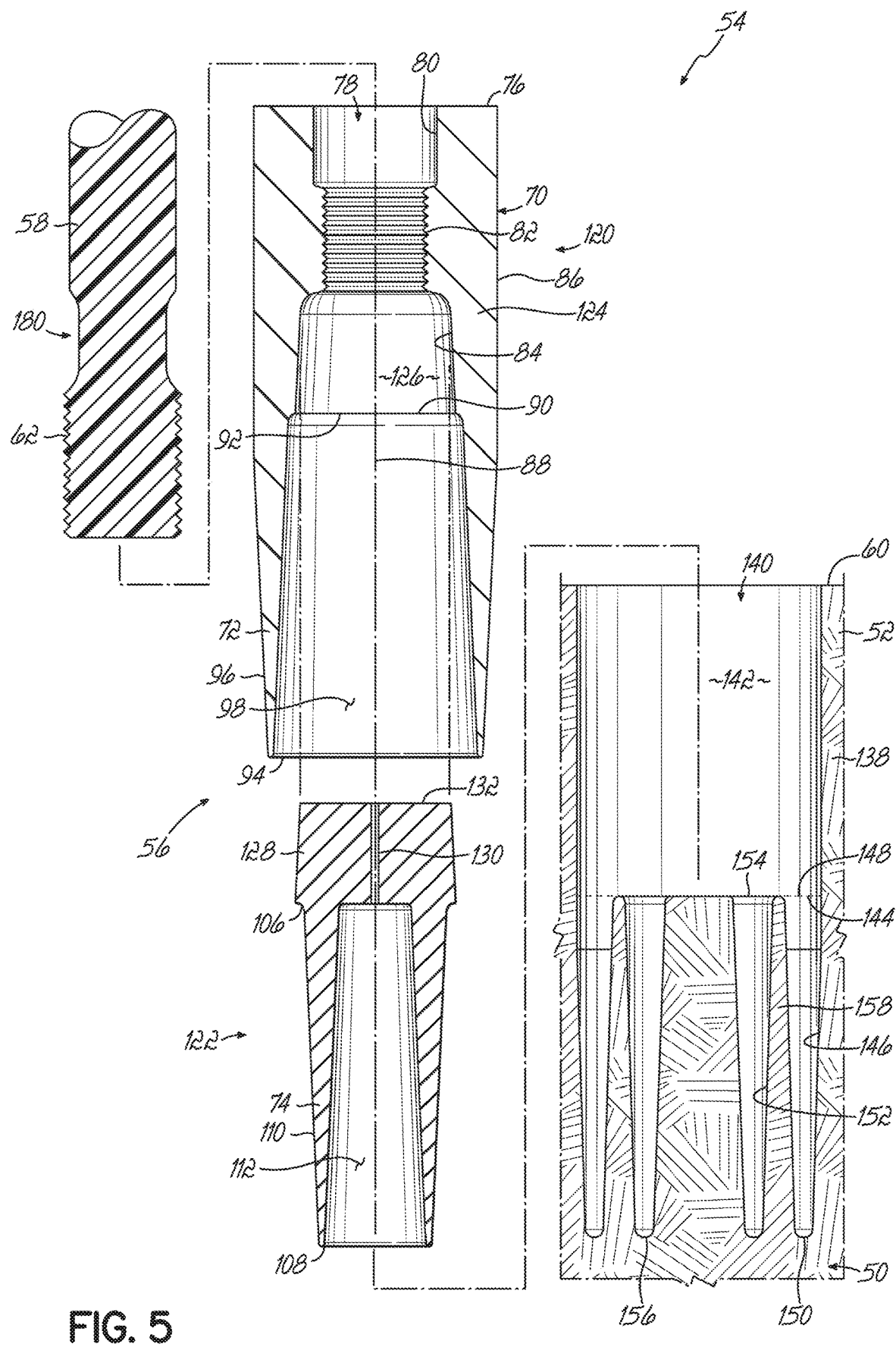
FIG. 5 is a disassembled cross-sectional view of a connection joint for a wind turbine rotor blade and rotor hub.
Figure 6:
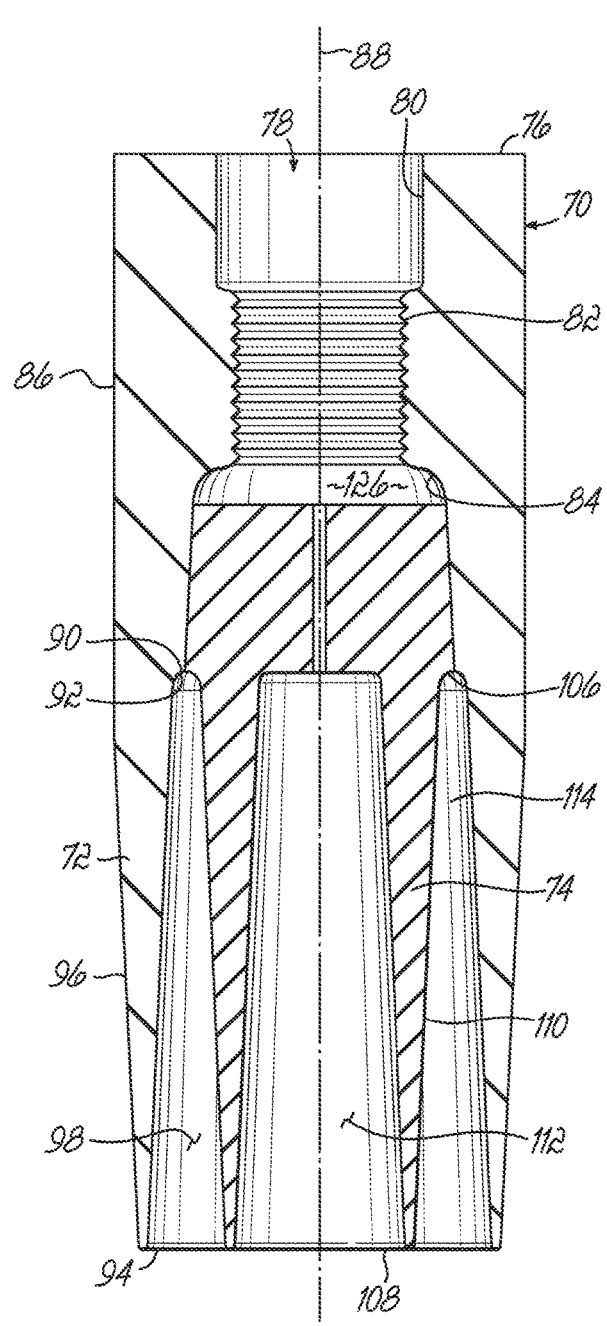
FIG. 6 is a cross-sectional view of an insert.
Figure 7:
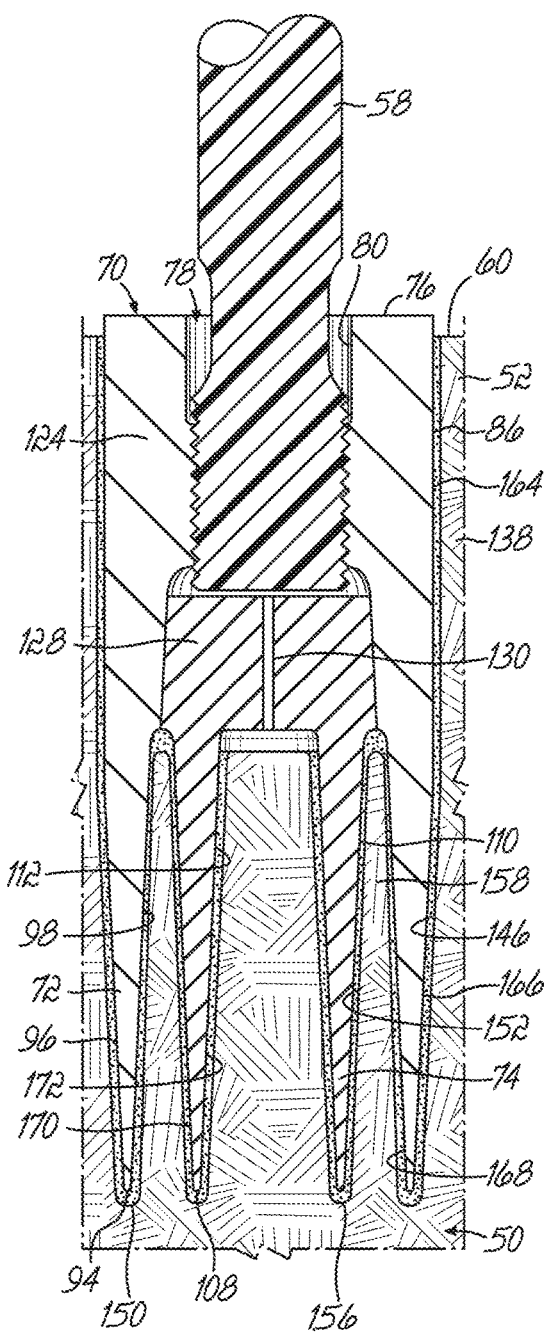
FIG. 7 is an assembled cross-sectional view of a connection joint for a wind turbine rotor blade and rotor hub.

A connection joint 54 for improving the connection between the rotor hub 48 and rotor blade 50 is illustrated in FIGS. 5-7. In this embodiment, the insert 56 includes a generally cylindrical main body 70 and at least two tubular extensions 72, 74 projecting from an end of the main body 70 (two shown) and configured to engage with the material (e.g., a composite material) of the wind turbine blade 50 along inner and outer surfaces of each of the tubular extensions 72, 74 (FIG. 7). In an advantageous aspect, the multiple tubular extensions from the main body 70 increase the overall surface area of contact between the insert 56 and the material that forms the blade 50. Additionally, the multiple tubular extensions increase the contact perimeter at the free end of the inserts. As a result of the increase in the free end contact perimeter, the loading capacity of the connection joint 54 is correspondingly increased. Thus, given a fixed width (e.g., diameter) and length of an insert, the insert 56 will provide an increased loading capacity as compared to conventional inserts, such as those described above. Consequently, the inserts 56 may accommodate larger blades 50 without a corresponding increase in the width or length of the inserts.

The main body 70 of the insert 56 includes a connecting end 76 and a central bore 78 extending inwardly from the connecting end 76 and configured to receive a stud bolt 58 therein, as illustrated in FIG. 7. The central bore 78 includes a first inlet portion 80 adjacent the connecting end 76, a second threaded portion 82 adjacent the inlet portion 80, and a third expansion portion 84 adjacent the threaded portion 82. The inlet portion 80 is generally circular in cross section, has smooth side walls, and is sized so as to receive the stud bolt 58 therein. In an exemplary embodiment, the length of the inlet portion 80 along the central bore 78 may be between about 0.25 D and about 2 D, where D is the major diameter of the threaded blade end 62 of the stud bolt 58 configured to be received in the central bore 78. It should be recognized that other lengths are also possible and remain within the scope of the present invention.

The threaded portion 82 includes internal threads configured to mesh with the threads on the blade end 62 of the stud bolt 58. By way of example and without limitation, the threaded portion 82 may be configured to receive a M20-M50 threaded stud bolt 58 (and preferably about an M30 threaded bolt) and have a length along the central bore 78 between about 0.5 D and about 3 D. Other lengths may also be possible and the invention is not limited to the range above.

Lastly, the expansion portion 84 has a cross dimension greater than that of the threaded portion 82, wherein the increase in the size of the cavity immediately adjacent the threads is configured to reduce the stress concentrations at the first thread and more evenly distribute the forces over several threads. In an exemplary embodiment, the expansion portion 84 may be generally cylindrical with a diameter greater than the diameter of the threaded portion 82. For example, the diameter of the expansion portion 84 may be between about 5% and about 50% greater than the diameter of the threaded portion 82. Moreover, the length of the expansion portion 84 along the central bore 78 may be between 0.1 D and 1 D in various embodiments. It should be recognized that the diameter and length may have other values and remain within the scope of the present invention.

In an exemplary embodiment, the main body 70 of the insert 56 may be generally cylindrical, wherein the outer surface 86 of the main body 70 is generally parallel to a central axis 88 of the insert 56. Moreover, the main body 70 may be sized such that the outer surface 86 is between about 1.5 D and about 3 D. The size of the main body 70 may be smaller or larger than that provided above. Additionally, the length of the main body 70 may be between about 0.4 D and about 6 D. The length may also have other values outside of this range. In an exemplary embodiment, the main body 70 may be formed from a metal, such as steel. However, it should be recognized that in alternative embodiments, other types of metals, or even other suitably strong non-metal materials, may be used to form the main body 70 of the insert 56.

In an exemplary embodiment, the first tubular extension 72 has a first end 90 coupled to a tip end 92 of the main body 70 and extends away from the main body 70 to a free end 94. In one embodiment, the first tubular extension 72 may be generally cylindrical, wherein an outer surface 96 and an inner surface 98 of the extension 72 extends straight away from the main body 70 so as to be generally parallel to the central axis 88 of the insert 56. Accordingly, the wall thickness of the first tubular extension 72 may remain substantially constant along the length of the first tubular extension 72 from the first end 90 to the free end 94. Moreover, the first tubular extension 72 may be sized so that the outer surface 96 of the first tubular extension 72 at the first end 90 aligns or smoothly mates with the outer surface 86 of the main body 70 at the tip end 92. Additionally, the length of the first tubular extension 72 may be between about 2 D and about 10 D. However, other lengths are also possible. In an exemplary embodiment, the first tubular extension may be formed from a metal, such as steel. However, it should be recognized that in alternative embodiments, other types of metals, or even other suitably strong non-metal materials, may be used to form the first tubular extension 72 of the insert 56.

In an alternative embodiment, and as illustrated in FIGS. 5-7, the first tubular extension 72 may be generally conical, wherein the outer surface 96 and/or the inner surface 98 forms an acute angle relative to the central axis 88 of the insert 56. In this regard, the outer surface 96 of the first tubular extension 72 may taper inward toward the central axis 88 in a range between about 1 degree and about 20 degrees. Similarly, the inner surface 98 of the first tubular extension 72 may taper outwardly away from the central axis 88 in a range between about 1 degree and about 20 degrees. Accordingly, the wall thickness of the first tubular extension 72 may decrease in a direction from the first end 90 toward the free end 94. By way of example, the wall thickness may decrease between about 10% and about 80% from the first end 90 to the free end 94. A reduction outside the range noted above is also possible. For example, the free end 94 may be relatively sharp having substantially no thickness at the end. In one embodiment, the taper angle of the outer and/or inner surface 96, 98 may be generally constant along the length of the first tubular extension 72 from the first end 90 to the free end 94. Alternatively, the taper angle may vary along the length of the first tubular extension 72 from the first end 90 to the free end 94.

As discussed above, in an advantageous aspect, the insert 56 includes a second tubular extension 74 configured to increase the area of contact between the insert and the material at the root end 52 of the blade 50. In an exemplary embodiment, the second tubular extension 74 may be coaxially arranged relative to the first tubular extension 72. More particularly and as illustrated in FIG. 6, the second tubular extension 74 may be positioned within the first tubular extension 72 such that the first tubular extension 72 is arranged as an outer tubular member and the second tubular extension 74 is arranged as an inner tubular member.

Similar to the first tubular extension 72, the second tubular extension 74 has a first end 106 coupled to the tip end 92 of the main body 70 and extends away from the main body 70 to a free end 108. In one embodiment, the second tubular extension 74 may be generally cylindrical, wherein an outer surface 110 and an inner surface 112 of the extension 74 extends straight away from the main body 70 so as to be generally parallel to the central axis 88 of the insert 56. Accordingly, the wall thickness of the second tubular extension 74 may remain substantially constant along the length of the second tubular extension 74 from the first end 106 to the free end 108. Moreover, the second tubular extension 74 may be sized so as to fit within the first tubular extension 72 and define a space or gap 114 between the outer surface 110 of the second tubular extension 74 and the inner surface 98 of the first tubular extension 72 (FIG. 6). By way of example, the outer diameter of the second tubular extension 74 at the first end 106 may be between about 20% and about 70% of the outer diameter of the first tubular extension 72 at the first end 90. Other values are also possible. Additionally, the gap 114 may terminate in an arcuate region adjacent the main body 70. Furthermore, the length of the second tubular extension 74 may be such as to be coterminous with the free end 94 of the first tubular extension 72. In an alternative embodiment, however, the free end 108 of the second tubular extension 74 may be inward or outward of the free end 90 of the first tubular extension 72. In an exemplary embodiment, the second tubular extension 74 may be formed from a metal, such as steel. However, it should be recognized that in alternative embodiments, other types of metals, or even other suitably strong non-metal materials, may be used to form the second tubular extension 74 of the insert 56.

In an alternative embodiment, and as illustrated in FIGS. 5-7, the second tubular extension 74 may be generally conical, wherein the outer surface 110 and/or the inner surface 112 forms an acute angle relative to the central axis 88 of the insert 56. In this regard, the outer surface 110 of the second tubular extension 74 may taper inward toward the central axis 88 in a range between about 1 degree and about 20 degrees. Similarly, the inner surface 112 of the second tubular extension 74 may taper outwardly away from the central axis 88 in a range between about 1 degree and about 20 degrees. Accordingly, the wall thickness of the second tubular extension 74 may decrease in a direction from the first end 106 toward the free end 108. By way of example, the wall thickness may decrease between about 10% and about 80% from the first end 106 to the free end 108. A reduction outside the range noted above is also possible. For example, the free end 94 may be relatively sharp having substantially no thickness at the end. In one embodiment, the taper angle of the outer and/or inner surface 110, 112 may be generally constant along the length of the second tubular extension 74 from the first end 106 to the free end 108. Alternatively, the taper angle may vary along the length of the second tubular extension 74 from the first end 106 to the free end 108.

In an exemplary embodiment, the first and second tubular extensions 72, 74 may have a similar configuration, such as having similar geometrical configurations, lengths, taper angles, wall thickness, etc. The invention, however, is not limited to such an arrangement, and in alternative embodiments the configuration of the first and second tubular extensions 72, 74 may be different from each other, including different geometric configurations, lengths, taper angles, wall thickness, etc.

In one embodiment, the insert 56 may be formed as a unitary member wherein the main body 70, first tubular extension 72, and the second tubular extension 74 may be integrally formed together as a monolithic member. In an alternative embodiment, however, the insert 56 may have a two-part design or construction wherein the two parts are separately formed and then subsequently coupled together to form the insert 56. In this regard and as illustrated in FIG.

5, the insert 56 may include a first insert element 120 and a second insert element 122 which are separately formed and subsequently coupled to form the insert 56. In an exemplary embodiment, each of the insert elements 120, 122 carries one of the tubular extensions 72, 74 of the insert 56. For example, the first insert element 120 may carry the first tubular extension 72 and the second insert element 122 may carry the second tubular element 74. When the first and second insert elements 120, 122 are coupled together, such as in a manner discussed below, the elements collectively form the main body 70 and the first and second tubular extensions 72, 74. The two-part design provides a more cost effective approach for manufacturing the inserts 56 and is more feasible from a manufacturing standpoint.

As shown in FIG. 5, the first insert element 120 includes a base 124 and the first tubular extension 72 extending from a tip end of the base 124. In an exemplary embodiment, the base 124 and first tubular extension 72 may be integrally formed as a unitary body. In an alternative embodiment, however, the base 124 and the first tubular extension 72 may be separate pieces which are subsequently coupled together. The base 124 includes the central bore 78 as described above. In addition, the base 124 includes a cavity 126 which is open to the hollow of the first tubular extension 72, and thus accessible from the free end 94 of the first tubular extension 72. The cavity 126 may also be open to the central bore 78. In one embodiment, the cavity 126 may be a longitudinal extension of the expansion portion 84 of the central bore 78. As described below, the cavity 126 is configured to receive an aspect of the second insert element 122 in order to couple the two elements 120, 122 together to form the insert 56.

The second insert element 122 includes a generally cylindrical base 128 and the second tubular extension 74 extending from a tip end of the base 128. In an exemplary embodiment, the base 128 and the second tubular extension 74 may be integrally formed as a unitary body. In an alternative embodiment, however, the base 128 and the second tubular extension 74 may be separate pieces which are subsequently coupled together. For purposes that will be discussed in more detail below, the base 128 includes a channel 130 extending from a first end 132 of the base 128 and open to the hollow of the second tubular extension 74.

To form the insert 56 from the two insert elements 120, 122, the second insert element 122 may be inserted through the free end 94 of the first tubular extension 72 of the first insert element 120 and through the hollow of the first tubular extension 72 until the base 128 of the second insert element 120 is seated within the cavity 126 in the base 124 of the first insert element 120, as shown in FIG. 6. In one embodiment, the coupling between the two insert elements 120, 122 may be achieved by a press fit between base 128 of the second insert element 122 and the cavity 126 of the first insert element 120. In this regard, an outer surface of the base 128 may be slightly tapered to facilitate such a press fit. It should be recognized, however, that the coupling between the insert elements 120, 122 may be achieved by alternative or additional processes, including bonding, shrink connections, ultrasonic welding, etc. A threaded connection may also be used to couple insert members 120, 122. The threaded connection, however, should be sufficiently tight such that there is substantially no play between the two inserts. When the first and second insert elements 120, 122 are coupled, the insert 56 as described above may be formed. In this regard, the bases 124, 128 collectively define the main body 70 of the insert 56 with the first and second tubular extensions 72, 74 extending from the tip end 92 thereof. As further illustrated in FIG. 6, the base 128 of the second insert element 122 essentially closes off the central bore 78 in the first insert element 120. However, the channel 130 in the base 128 may be open to the central bore 78 when the insert elements 120, 122 are coupled together.

As discussed above, a plurality of inserts 56 are circumferentially spaced about the end face 60 at the root end 52 of the rotor blade 50 and embedded in the material 138, such as a composite material, that forms the root end 52 of the blade 50. Thus, after the wind turbine blade 50, or at least the root end 52 thereof, is formed, a plurality of circumferentially spaced bores 140 may be formed in the end face 60 of the root end 52 of the blade 50. The bores 140 are generally configured to correspond in size and shape to the size and shape of the inserts 56 so that the inserts 56 may be received therein. In this regard, each bore 140 includes a first generally cylindrical cavity portion 142 that extends inwardly from the end face 60 and terminates at a second end 144. The width (e.g., cross dimension, diameter, etc.) of the bore 140 is just slightly larger than the inserts 56 configured to be received within the bores 140. Moreover, the length of the first cavity portion 142 is configured to generally correspond to the length of the main body 70 of the insert 56.

The bore 140 further includes a first annular cavity 146 having a first end 148 at the second end 144 of the first cavity portion 142 and extending inwardly therefrom and terminating at a second end 150. In this way, the first annular cavity 146 is open to the first cavity portion 142. The configuration of the first annular cavity 146 generally corresponds to the configuration of the first tubular extension 72. Thus, in an exemplary embodiment, the first annular cavity 146 may have a generally cylindrical configuration or a generally conical configuration to match that of the first tubular extension 72. Furthermore, the length of the first annular cavity 146 generally corresponds to the length of the first tubular extension 72. As can be appreciated, the first annular cavity 146 should be slightly larger than the first tubular extension 72 (e.g., about 0.5 mm spacing) and slightly longer than the first tubular extension (e.g., about 5 mm longer) so as to accommodate the first tubular extension and surrounding adhesive.

In a similar manner, the bore 140 further includes a second annular cavity 152 having a first end 154 at the second end 144 of the first cavity portion 142 and extending inwardly therefrom and terminating at a second end 156. In this way, the second annular cavity 152 is open to the first cavity portion 142. The configuration of the second annular cavity 152 generally corresponds to the configuration of the second tubular extension 74. Thus, in an exemplary embodiment the second annular cavity 146 may have a generally cylindrical configuration or a generally conical configuration to match that of the second tubular extension 74. Furthermore, the length of the second annular cavity 152 generally corresponds to the length of the second tubular extension 74. As can be appreciated, the second annular cavity 152 should be slightly larger than the second tubular extension 74 (e.g., about 0.5 mm spacing) and slightly longer than the second tubular extension (e.g., about 5 mm longer) so as to accommodate the second tubular extension and surrounding adhesive. In an exemplary embodiment, the second annular cavity 152 is coaxially arranged relative to the first annular cavity 146. More particularly, and as illustrated in FIG. 5, the second annular cavity 152 may be positioned inwardly of the first annular cavity 146 such that the first annular cavity 146 is arranged as an outer annular cavity and the second annular cavity 152 is arranged as an inner annular cavity.

In one embodiment, the bores 140 may be formed by first drilling the first cavity portion 142 with a suitable drill element or bit. Subsequently, the two annular cavities 146, 152 may be formed using appropriately sized hollow drill elements, such as a diamond tipped drill element. The annular cavities 146, 152 may be formed in a serial manner or may be formed simultaneously. In an alternative embodiment, however, a single drill element may be used to form the entire bore 140. Those of ordinary skill in the art may recognize alternative or additional methods for forming the bores 140 in the root end 52 of the blades 50 and the invention is not limited to that described herein. Additionally, there may be alternative processes to embed the inserts 56 within the root end 52 of the blade 50. By way of example, the inserts 56 may be part of a moulding process used to form the blade. Thus, the invention should not be limited to the formation of bores in the root end of the blade for embedding the inserts within the blade.

As illustrated in FIG. 7, with the bores 140 formed in the end face 60 at the root end 52 of the rotor blade 50, the inserts 56 may be positioned therein. In this regard, the inserts 56 may be positioned such that the main body 70 of the insert 56 is generally positioned in the first cavity portion 142, the first tubular extension 72 is generally positioned in the first annular cavity 146, and the second tubular extension 74 is generally positioned in the second annular cavity 152. In an exemplary embodiment, to couple the inserts 56 to the root end 52 of the wind turbine blade 50, the inserts 56 may be adhesively bonded within the bores 140, such as with a suitable epoxy. This may be achieved, for example, by locating adhesive deposits or packets (not shown) within the gap 114 between the first and second tubular extensions 72, 74. Such an adhesive may be epoxy adhesive. In this way, as the insert 56 is pushed into the bore 140, the annular extension of blade material 158 contacts the adhesive deposit and forces the adhesive to flow along the interface between the insert 56 and the bore 140. The adhesive then cures to secure the inserts 56 within the bores 140 of the wind turbine blade 50.

If necessary, additional processes may be implemented to ensure a sufficient bond between the inserts 56 and the bores 140. For example, inlet ports (not shown) may be formed through the outer and/or inner side wall at the root end 52 of the blade 50 such that the inlet ports are in communication with the first cavity portion 142 and/or the first annular cavity 146 of the bores 140. Adhesive may then be pumped through the inlet ports so as to fill the interstitial space between the inserts 56 and the bores 140. The channel 130 may be used to allow air and excess adhesive to escape during the bonding process. Alternatively, a vacuum may be pulled at the channel 130 to facilitate adhesive flow along the interface between the inserts 56 and the bores 140. Those of ordinary skill in the art may recognize other processes to ensure that the inserts 56 are sufficiently bonded to the bores 140 in the root end 52 of the rotor blade 50 and the invention is not limited to that described herein.

As illustrated in FIG. 7, when an insert 56 is embedded in the root end 52 of the rotor blade 50, the main body 70 of the insert 56 defines a bonding interface 164 with the material 138 of the blade 50 at the outer surface 86 of the main body 70. Moreover, the first tubular extension 72 which extends from the main body 70 defines an outer bonding interface 166 with the material 138 of the blade 50 at the outer surface 96 of the first tubular extension 72, and an inner bonding interface 168 with the material 138 of the blade 50 at the inner surface 98 of the first tubular extension 72. In an advantageous aspect, the second tubular extension 74 which extends from the main body 70 defines an outer bonding interface 170 with the material 138 of the blade 50 at the outer surface 110 of the second tubular extension 74, and an inner bonding interface 172 with the material 138 of the blade 50 at the inner surface 112 of the second tubular extension 74. The bonding interfaces 170, 172 provided by the second tubular extension 74 provide a significant increase in contact surface area between the insert 56 and blade material 138. Additionally, the inclusion of the second tubular extension 74 increases the contact perimeter at the free of the insert 56. This increase in contact perimeter in turn increases the load capacity of the connection joint 54 between the rotor blade 50 and rotor hub 48.

As discussed above, to facilitate the coupling of the rotor blade 50 to the rotor hub 48, stud bolts 58 may be inserted into the central bore 78 of the inserts 56 and rotated so as to engage the threads at the blade end 62 of the stud bolts 58 with the threads in the threaded portion 82 of the central bore 78 in the inserts 56. The stud bolts 58 may be inserted into the central bore 78 until the threaded end of the stud bolts 58 are even with or extend beyond the first or most interior thread of the threaded portion 82 (FIG. 7). For example, in one embodiment the threaded end of the stud bolts 58 may extend past the first thread and may be just slightly spaced from the base 128 of the second insert element 122 that closes off the central bore 78. Having the end of the stud bolts 58 extend beyond the first thread of the threaded portion 82 provides for a more uniform distribution of forces across the threads and reduces the likelihood of high stress concentrations during use.

In accordance with another aspect, the stud bolts 58 may include a stress reducing element, generally shown at 180, adjacent the threaded blade end 62 of the stud bolt 58. For example, in one embodiment the stress reducing element may be immediately adjacent the threaded blade end 62. In an alternative embodiment, however, the stress reducing element 180 may be slightly spaced from the threads of the blade end 62. During operation of the wind turbine, the blades are subjected to aerodynamic and gravitational loads which results in flapwise and edgewise bending moments—and these bending moments are retained by axial forces in the stud bolts 58. When the wind turbine blades are attached to the rotor hub, the blade structure and the hub structure are not symmetrical about the bolt pattern and so some radial deformations occur in the stud bolts which force the stud bolts into bending about their centrelines. Therefore, the stud bolts 58 experience both axial stresses and bending stresses. To reduce the bending stresses in the stud bolts, the stud bolts have a reduced cross dimension which makes the stud bolts more flexible in the direction of the radial deformation. The radial deformations in the stud bolts are generally not limited by the bending stiffness of the stud bolts 58 and so a thinner section of the stud bolt will result in the stud bolt experiencing less bending stress for the same radial deformation—because the outer surfaces of the bolts typically experience the largest stresses. Therefore, to reduce the bending stresses in the stud bolts 58 for the same radial deformation, a localized region having a reduction in the relevant cross dimension of the stud bolts is provided. This reduction in cross dimension, however, is such as not to jeopardize the structural integrity of the connecting joint 54.

For example, in one embodiment the stress reducing element 180 may be formed as neck region wherein a cross dimension of the neck region is less than the cross dimension of the threaded blade end 62. In an exemplary embodiment, the neck region includes a first end adjacent the blade end 62 and a second end more adjacent the hub end 64 such that the neck region 182 has a length less than, and preferably significantly less than, the length of the stud bolt 58. The neck region may be located more toward the blade end 62 than the hub end 64 of the stud bolt 58. The cross dimension of the neck region may also be less than a cross dimension of the stud bolt 58 adjacent the neck region and between the second end and the hub end 64 of the stud bolt 58 (e.g., on the opposite side from the blade end 62).

In one embodiment as illustrated in FIGS. 8 and 8A, the neck region 182 may be generally cylindrical with a generally circular cross section, wherein the diameter of the neck region 182 is less than the diameter of the threaded blade end 62. The diameter of the neck region 182 may also be less than the diameter of the stud bolt 58 adjacent the neck region 182 and between the second end and the hub end 64 of the stud bolt 58. By way of example, the neck region 182 may be formed through a machining process (e.g., milling operation) that removes material from a formed stud bolt. In an exemplary embodiment, the diameter of the neck region 182 may be reduced between about 5% and about 40% compared to the diameter of the blade end 62 of the stud bolt 58. Other values may also be possible outside of this range. Moreover, the length of the neck region 182 may be between about 0.5 D and about 2 D. However, other lengths are also possible. In addition, the neck region 182 may include one or more transitions 184, such as tapers, chamfers or the like, at one or both ends of the neck region 182 to provide a smooth reduction/expansion in the cross dimension of the stud bolt 58, thereby avoiding stress concentrations generally associated with relatively sharp corners and steps.

In another embodiment and as illustrated in FIGS. 9 and 9A, the stud bolts 58 may include a neck region 186 having a generally elliptical cross section. The neck region 186 may be characterized by a first cross dimension as the major axis 188 of the elliptical cross section and a second cross dimension as the minor axis 190 of the elliptical cross section. The sides of the neck region 186 that generally extend in the direction of the major axis 188 may define a generally flat or planar portion 192. In an exemplary embodiment, the minor axis 190 has a length less than the diameter of the threaded blade end 62. The length of the minor axis 190 may also be less than the diameter of the stud bolt 58 adjacent the neck region 186 and between the second end and the hub end 64 of the stud bolt 58. By way of example, the minor axis 190 of the neck region 186 may be reduced between about 5% and about 40% compared to the diameter of the blade end 62 of the stud bolt 58. However, other values are possible.

In the exemplary embodiment, the major axis 188 may have a length greater than the diameter of the threaded blade end 62, and possibly greater than the diameter of the stud bolt 58 adjacent the neck region 186 and between the second end of the neck region and the hub end 64 of the stud bolt 58. By way of example, such a neck region 186 may be formed during the formation of the stud bolt 56. In this regard, opposite sides of the stud bolt 56 may be pressed, using a suitable press or the like, inwardly toward each other, thereby defining the minor axis 190 and the flat regions 192. This pressing then causes a bulging or expansion of material in the transverse direction (e.g., such that the cross-sectional area remains substantially constant), thereby defining the major axis 188 and resulting in an elliptical cross-sectional neck region 186. Similar to the above, the length of the neck region 186 may be between about 0.5 D and about 2 D. However, other lengths are also possible. In addition, the neck region 188 may include one or more transitions, such as tapers, chamfers or the like, at one or both ends of the neck region to provide a smooth reduction/expansion in the cross dimension of the stud bolt 58, thereby avoiding stress concentrations generally associated with relatively sharp corners and steps.

Figure 10:
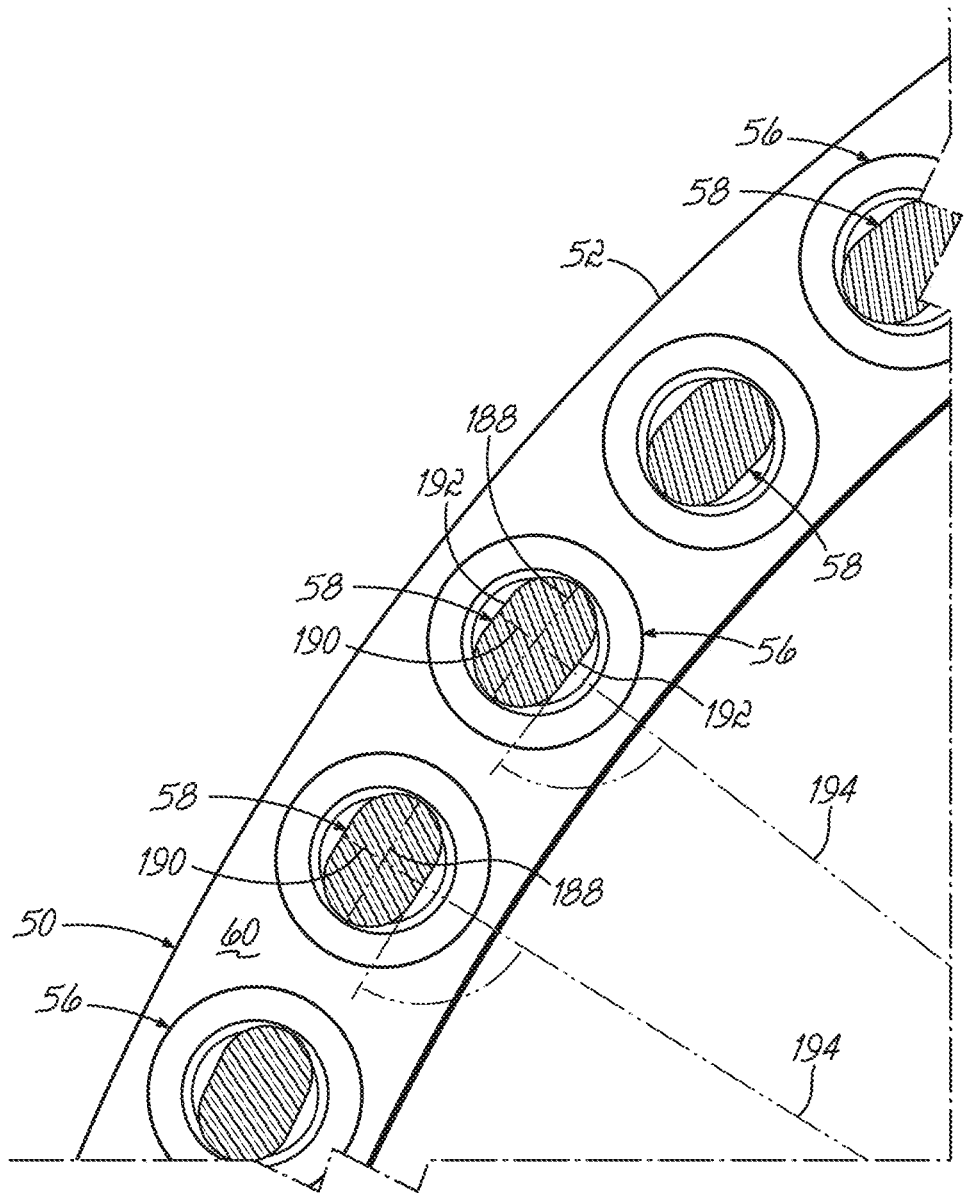
FIG. 10 is a partial end view of the root portion of the wind turbine blade.

There is a preferred orientation of the neck region 186 relative to the central axis of the blade 50 at the root end 52 of the blade 50. In this regard and as illustrated in FIG. 10, the stud bolts 58 may be oriented such that the major axis 188, or the flat portions 192, of the neck region 186 are generally perpendicular to radial lines 194 extending outwardly from the central axis of the blade 50 at the root end 52 and generally intersecting a centre of the elliptical cross section. In this way, the minimum cross dimension of the stud bolt is generally parallel to the radial lines 194. With a reduction in the minor axis 190 compared to the diameter of the blade end 62 of the stud bolt 58, the stresses at the surface of the stud bolts 58 in the neck region 186 (i.e., the location of maximum stress) may be reduced when the stud bolts are subjected to generally radial bending loads.

Figure 11:
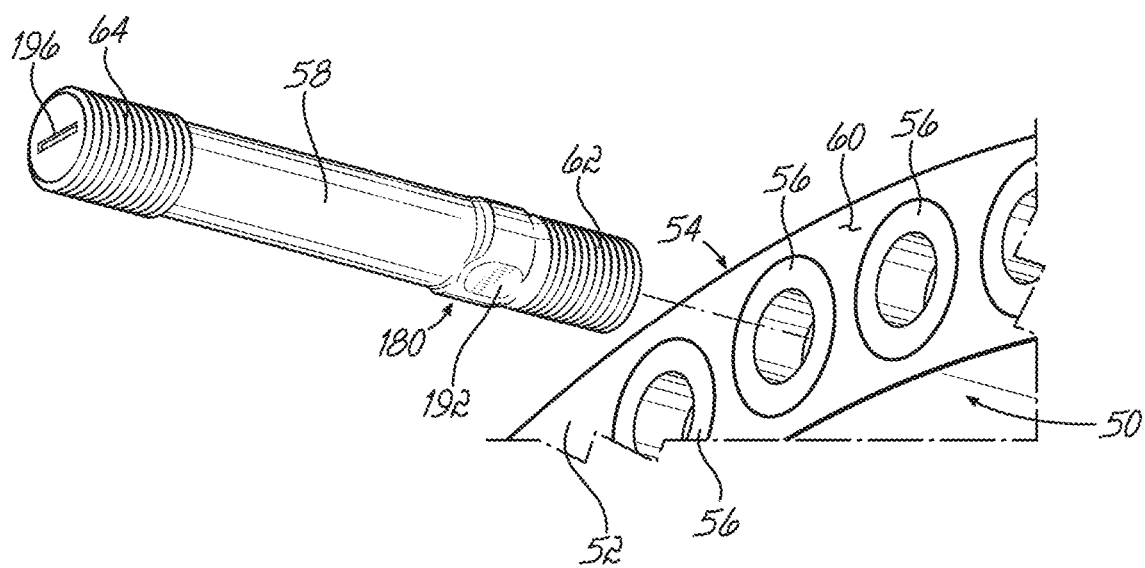
FIG. 11 is a partial perspective view of a stud bolt.

In order to place the stud bolts 58, and more particularly the neck region 186, in the proper orientation during coupling of the blade 50 to the hub 48, the stud bolts 58 may include an indicator 196 adjacent the hub end 64 of the stud bolts 58. In this regard, technicians inside the hub 48 cannot see the neck region 186 of the stud bolts 58 during installation of the blade 50 since the neck region 186 is exterior to the hub 48. By using the indicator 196, however, the technician can ensure the proper orientation of the neck region 186 without a visual confirmation of the neck region itself. In one embodiment, for example, and as illustrated in FIG. 11, the indicator 196 may be a groove, notch or line formed in the end face of the threaded hub end 64 having an orientation matching that of the major axis 188 of the neck region 186. Other symbols may also be used to identify the orientation of the neck region 186, such as by corresponding to the major and/or minor axis 188, 190 or other geometric aspect of the neck region 186. By viewing the indicator, the technician may adjust the stud bolts 58 such that the neck region 186 has the orientation illustrated in FIG. 10.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. For example, while the invention has been described in terms of a stud bolt, the invention may be beneficial in applications using other types of bolts or elongated connectors, such as head bolts, etc. Thus, the various features of the invention may be used alone or in any combination depending on the needs and preferences of the user.

The invention claimed is:

1. A connecting joint for attaching a wind turbine rotor blade to a rotor hub comprising a bolt defining a longitudinal axis and having a threaded blade end configured to be coupled to the rotor blade, a hub end configured to be coupled to the rotor hub, and an intermediate region extending between the blade end and hub end of the bolt,
    wherein the bolt includes a neck region disposed in the intermediate region having a length along the longitudinal axis significantly less than a length of the intermediate region along the longitudinal axis, wherein the neck region is disposed more toward the blade end of the bolt than the hub end of the bolt, and wherein a cross-sectional profile of the bolt at the neck region is different than a cross-sectional profile of the bolt at the intermediate region outside the neck region, and, wherein the neck region is generally elliptical having a first cross dimension that forms the major axis of the elliptical cross section, and a second cross dimension that forms the minor axis of the elliptical cross section, wherein the minor axis has a length less than a cross dimension of the blade end of the bolt, and wherein the major axis has a length greater than a cross dimension of the blade end of the bolt.

2. The connecting joint according to claim 1, wherein the neck region is immediately adjacent the threads on the blade end of the bolt.

3. The connecting joint according to claim 1, wherein the minor axis has a length less than a diameter of the blade end of the bolt.

4. The connecting joint according to claim 3, wherein the length of the minor axis is reduced between about 5% and about 40% relative to the diameter of the blade end of the bolt.

5. The connecting joint according to claim 1, wherein the major axis has a length greater than a diameter of the blade end of the bolt.

6. The connecting joint according to claim 1, further comprising an indicator adjacent the hub end that corresponds to an orientation of the neck region.

7. The connecting joint according to claim 1, wherein the neck region has a first end towards the blade end of the bolt and a second end towards the hub end of the bolt, and wherein the cross dimension of the neck region is less than a cross dimension of the bolt between the second end and the hub end of the bolt.

8. The connecting joint according to claim 7, wherein the neck region has a length between the first and second ends between about 0.5 D and about 2 D, where D is the diameter of the blade end of the bolt.

9. The connecting joint according to claim 1, wherein the neck region includes a transition to provide a smooth change in the cross dimension of the bolt.

10. The connecting joint according to claim 1, further comprising an insert configured to be coupled to the wind turbine blade, wherein the blade end of the bolt is configured to be coupled to the insert.

11. The connecting joint according to claim 1, wherein the bolt is a stud bolt.

12. A wind turbine rotor blade having a root end and a tip end, the rotor blade comprising a plurality of connecting joints according to claim 10, wherein the inserts of the connecting joints are embedded in the root end of the rotor blade.

13. The wind turbine rotor blade according to claim 12, wherein the inserts comprise:
    a main body having a first end and a second end, a central bore open to the first end and extending toward the second end, and an outer surface configured to interface with the blade;
    a first tubular extension extending away from the second end of the main body and having an inner surface and an outer surface, each of the inner and outer surfaces configured to interface with the blade; and
    a second tubular extension extending away from the main body and having an inner surface and an outer surface, each of the inner and outer surfaces configured to interface with the blade.

14. The wind turbine rotor blade according to claim 12, wherein the rotor blade includes a central axis at the root end, and wherein the bolts are coupled to the inserts and oriented such that a major axis of an elliptical cross section of the neck region is substantially perpendicular to radial lines from the central axis of the rotor blade.

15. A method of forming a connecting joint for attaching a wind turbine rotor blade to a rotor hub, comprising:
    providing a bolt defining a longitudinal axis and having a blade end, a hub end, and an intermediate region extending between the blade end and hub end; and
    forming a neck region in the intermediate region; i) having a length along the longitudinal axis significantly less than a length of the intermediate region along the longitudinal axis, ii) being positioned more toward the blade end of the bolt than the hub end of the bolt, and iii) having a cross-sectional profile that is different than a cross-sectional profile of the bolt outside the neck region,
    wherein the neck region is generally elliptical having a first cross dimension that forms the major axis of the elliptical cross section, and a second cross dimension that forms the minor axis of the elliptical cross section, wherein the minor axis has a length less than a cross dimension of the blade end of the bolt, and wherein the major axis has a length greater than a cross dimension of the blade end of the bolt.

16. The method according to claim 15, wherein forming the neck region further comprises pressing opposite sides of the bolt to form the generally elliptical neck region having the major axis and the minor axis.

17. The method according to claim 15, wherein the cross sectional area of the neck region remains substantially constant during formation of the neck region.

* * * * *